June 24, 1930.  G. PLATO  1,766,401
INTERNAL COMBUSTION ENGINE
Filed March 21, 1929   4 Sheets-Sheet 1
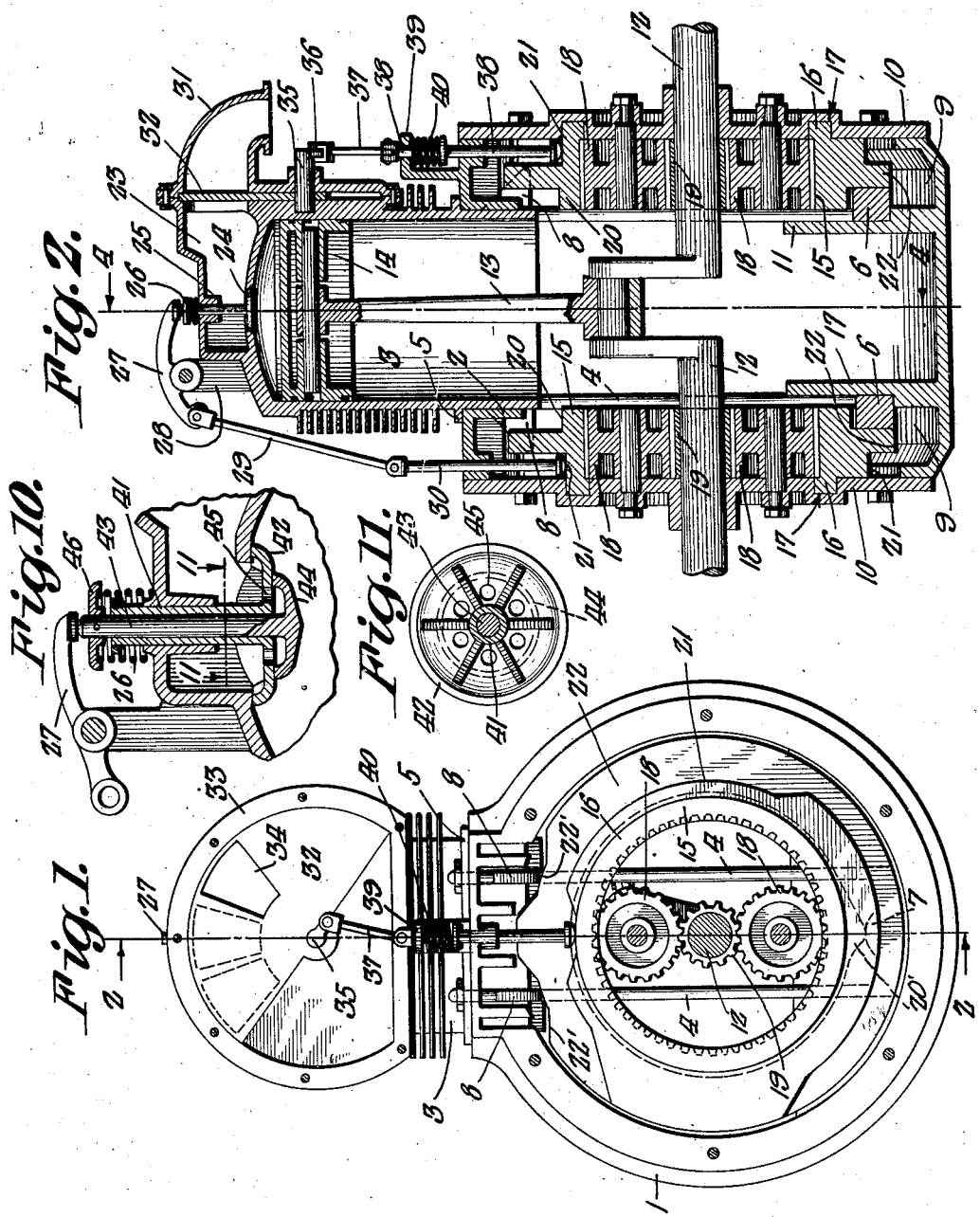
Gerhardt Plato,
INVENTOR
BY Victor J. Evans
ATTORNEY June 24, 1930.  G. PLATO  1,766,401
INTERNAL COMBUSTION ENGINE
Filed March 21, 1929  4 Sheets-Sheet 2
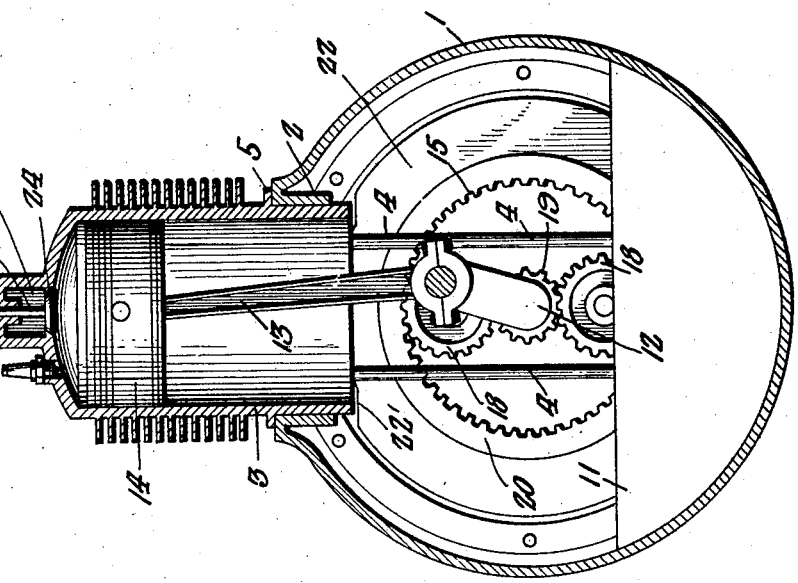
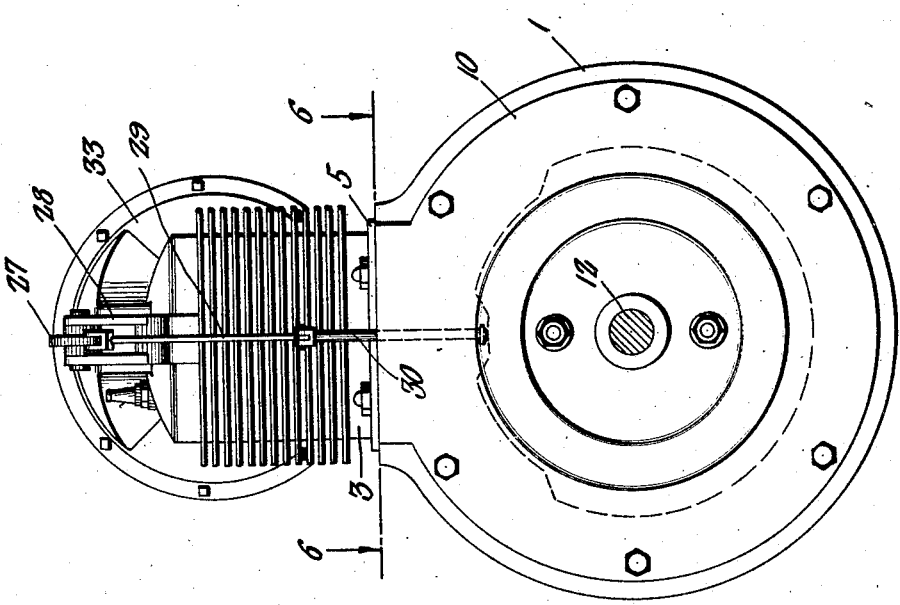
Gerhardt Plato,
INVENTOR
BY Victor J. Evans
ATTORNEY June 24, 1930.   G. PLATO   1,766,401
INTERNAL COMBUSTION ENGINE
Filed March 21, 1929    4 Sheets-Sheet 3
Fig. 5.
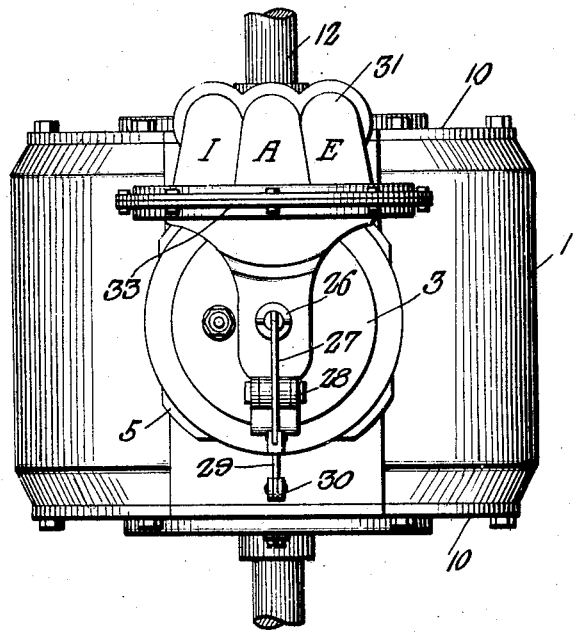
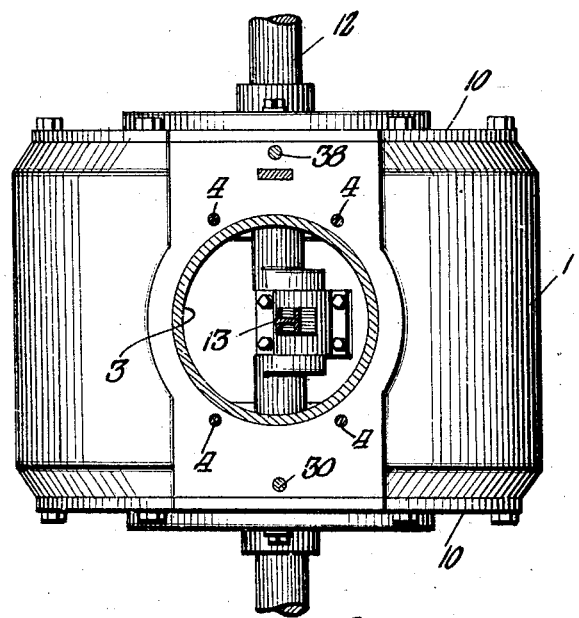
Fig. 6.
Gerhardt Plato,
INVENTOR
BY Victor J. Evans
ATTORNEY June 24, 1930. G. PLATO 1,766,401
INTERNAL COMBUSTION ENGINE
Filed March 21, 1929 4 Sheets-Sheet 4
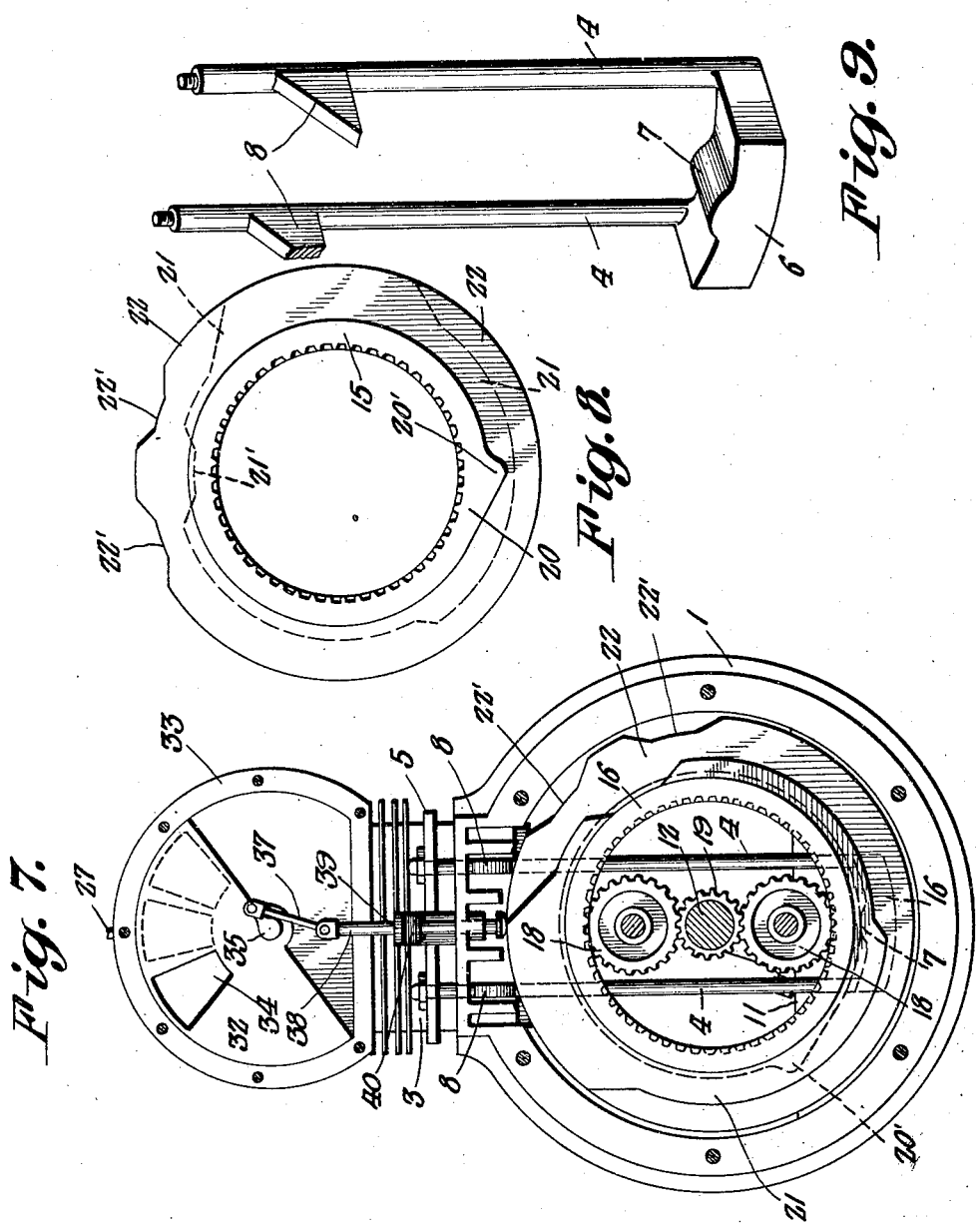
Gerhardt Plato,
INVENTOR
BY Victor J. Evans
ATTORNEY Patented June 24, 1930

1,766,401

UNITED STATES PATENT OFFICE

GERHARDT PLATO, OF CHICAGO, ILLINOIS

INTERNAL-COMBUSTION ENGINE

Application filed March 21, 1929. Serial No. 348,873.

This invention relates to an internal combustion engine, the general object of the invention being to provide means whereby the combustion of the charge in the cylinder takes place when the crank shaft has passed over dead center, thus eliminating pre-ignition troubles, this action being caused by a downward movement of the cylinder on the compression stroke of the piston.

Another object of the invention is to provide means whereby air is drawn into the cylinder on one stroke of the piston and exhausted from the cylinder on the next upward stroke of the piston, which acts to cool the engine.

A further object of the invention is to provide a single poppet valve for controlling the inlet and exhaust of the cylinder, with a shutter valve for controlling the inlets for the fuel and air and the exhaust of the gases and of the air.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is an elevation, with parts in section, of the improved motor, the parts being shown in the position they occupy when the charge is being ignited.

Figure 2 is a section on line 2—2 of Figure 1.

Figure 3 is a view showing the opposite side of the engine from that shown in Figure 1.

Figure 4 is a section on line 4—4 of Figure 2.

Figure 5 is a top plan view.

Figure 6 is a section on line 6—6 of Figure 3.

Figure 7 is a view similar to Figure 1, but showing the parts in a position to draw the mixture into the cylinder.

Figure 8 is a view of one of the cam carrying gears.

Figure 9 is a perspective view of one of the pairs of anchor members for the cylinder.

Figure 10 is a sectional detail view through the poppet valve.

Figure 11 is a section on line 11—11 of Figure 10.

In these drawings, the numeral 1 indicates a crank case which is provided with a flange 2 around the opening in its upper part, and 3 indicates the cylinder, the lower end of which is slidably arranged in the flanged opening. A number of pairs of anchor members 4 have their upper ends bolted to a flange 5 on the cylinder an appreciable distance from the lower end thereof, and the members of each pair are connected together by a shoe 6 at the lower ends of the members which is formed with a concaved upper face having a rounded projection 7 at the center thereof. Each member is also formed with a shoulder forming projection 8 adjacent the upper end thereof. As will be seen, these anchor members extend into chambers 9 formed at the sides of the crank case 1, through means of the side plates 10 and the partitions 11, these partitions terminating a distance below the crank shaft 12. This crank shaft is connected by the rod 13 with the piston 14 in the cylinder. A cam carrying gear 15 is arranged in each chamber 9, each gear being rotatably supported in the chamber by an annular rib 16 on the outer face of the gear engaging an annular groove 17 in the plate 10. Each gear has its teeth arranged on its inner circumference and a pair of idle gears 18, journaled in each chamber 9, mesh with these teeth and these idle gears also mesh with a pinion 19 on each straight part of the crank shaft. Thus the gears are driven from the crank shaft. Each gear carries the three cams 20, 21 and 22. The cam 20 carries a single projection 20' for engaging the shoe 6 and its projection 7, for forcing the anchor members downwardly and thus lowering the cylinder from the position it occupies in Figure 7, to that which it occupies in Figures 1, 2, 3 and 4. The cam 22 is formed with a pair of depressions or recesses 22' slightly spaced apart for receiving the projections 8 when the part 20' of the cam 20 is in engagement with the projection 7 of the shoe 6, the rest of the cam 22 being of circular shape for engaging the projections 8 and thus holding the cylinder in raised position. It will be understood that this arrangement of cams and anchor members is located on each side of the engine, as shown in Figure 2, and the parts are so arranged that the cylinder will be lowered just before the compressed mixture is ignited and the crank of the shaft 12 has passed dead center. This downward movement of the cylinder not only acts to highly compress the mixture between itself and the piston, but it also acts to prevent the force of the charge on the piston acting on the crank shaft when the same is in dead center, as this force is exerted on the pulling load.

A passage 23 is arranged in the upper end or head of the cylinder and is in communication with the cylinder by a port 24 which is controlled by a valve 25 normally held to its seat by a spring 26, the valve being opened by a rocker arm 27 pivoted to a post 28 on the head of the cylinder, and a link 29 connects the rocker arm with a push rod 30 which is guided for vertical movement in an upper part of the crank case, and the lower end of this push rod engages the cam 21 so that during the movement of the member 15 in the left hand chamber 9, the cam 21 will open the valve and then permit the valve to be closed by its spring 26.

A manifold 31 is attached to the head of the cylinder and has three passages I, A and E therein, all of these passages being in communication with the passage 23 which is provided with a flaring outer end for this purpose. It will be understood that the passage I is connected with a carbureter or other source of fuel, the passage E with an exhaust pipe and the passage A opens to the atmosphere. A shutter valve 32, of semi-circular shape, is arranged in a substantially circular housing 33 which intersects the junction of the manifold with the passage 23, and this shutter valve is formed with a single port 34 which registers with each of the passages I, A and E during the movement of the shutter valve. The pivot pin 35 of the valve has an arm 36 thereon which is connected by a link 37 with a push rod 38 guided for vertical movement in an upper part of the crank case and in an upright 39 connected with the crank case. A spring 40, engaging a projection on the push rod and the bent upper end of the upright, tends to hold the push rod with the valve 32 in a position with its ports 34 registering with the exhaust passage E, and this spring also holds the lower end of the push rod in engagement with the cam 21 at the right hand side of the engine.

I prefer to form the valve 25 of two sections, one section including a tubular stem 41 and a head 42 and the other section including a stem 43 which passes through the tubular stem 41 and a head 44 which normally engages the under face of the head 42 and covers the ports 45 in said head 42. The upper end of the stem 43 carries a disk 46 against which the upper end of the spring 26 bears and the rocker arm 27 engages the upper end of the stem 43. Thus during the first part of the movement of the arm 27, the stem 43 and the head 44 are lowered so as to expose the ports 45 and then the disk 46 comes into contact with the tubular stem 41, so that the head 42 is moved off its seat. This form of valve increases the efficiency of the motor, as the head 44 is opened first by a small movement of the rocker arm and then the head 42 is moved to open position by the further movement of the rocker arm, so that the friction is reduced to a minimum.

From the foregoing it will be seen that on the intake stroke of the piston, the cam 21 at the right will have moved the shutter valve to the position it occupies in Figure 7, with the port 34 opening communication between the intake I and the passage 23 and the cam 21 on the left has opened the valve 25. Thus the downward movement of the piston will draw fuel into the cylinder. When the piston starts to move upwardly, the valve 25 will be closed by its spring 26, as the left cam 21 has moved to a position to permit this closing and the spring 40 has moved the valve 34 to a position where the port 34 will place the exhaust E in communication with the passage 23 as the right cam has moved from under the push rod 38. When the compression stroke is about finished, the cams 20 will have their parts 20' engaging the projections 7 on the shoes 6, so that the anchor members are caused to move downwardly, pulling the cylinder with them, so that the combustion chamber is reduced and the charge greatly compressed. The highest compression takes place about one-tenth of the circumference of the path of the crank over dead center. The charge is then ignited and the piston moves downwardly on its power stroke. The cams 20 then disengage the projections 7 and the cylinder returns to its raised position through the action of the expanding gases and also due to the fact that the high part of the cam 22 engages the projections 8 and thus holds the cylinder and its associated parts in raised position. In order to prevent the lowering of the cylinder from opening the valve 25, the left cam 21 is formed with a recess 21' in its low part. When the power stroke is performed, the valve 25 is opened by the left cam 21 and as the valve 32 has opened the exhaust, the exhaust gases can pass through the passages 23 and E. When the exhaust stroke is performed, the valve 25 remains open and the shutter valve 32 is moved by the right cam 21 to its central position so that its port 34 will open the air passage A and this air will be drawn into the cylinder by the down stroke of the piston and then the air will be exhausted by the up stroke of the piston, the valves remaining open during these two strokes.

On the next down stroke of the piston, the valve 25 remains open and the shutter valve moves to a position where its port 34 will open the inlet I, so that an explosive mixture will be drawn into the cylinder. It will thus be seen that the engine works on the six-cycle principle.

If desired, oil may be mixed with the air flowing into the inlet A.

This improved engine will produce the maximum amount of power with the minimum amount of fuel, and pre-ignition troubles are eliminated, though if any such trouble should occur, it will not interfere with the operation of the engine, due to the fact that the compression point occurs after the crank has passed dead center.

While the drawings show the engine as air cooled, it will, of course, be understood that it can be cooled by water and that any desired number of cylinders may be used.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:—

1. An internal combustion engine comprising a crank case, a cylinder movably connected therewith, a crank shaft passing through the crank case, a piston in the cylinder, a rod connecting the shaft with the piston, means for moving the cylinder toward the piston during the compression stroke and when the crank of the shaft has passed dead center, such means comprising anchor members connected with the cylinder and passing into the crank case, shoes connected with the lower ends of the anchor members, a cam engaging the shoes for lowering the parts, means for operating the cam from the cam shaft and inlet and exhaust means associated with the cylinder.

2. An internal combustion engine comprising a crank case, a cylinder movably connected therewith, a crank shaft passing through the crank case, a piston in the cylinder, a rod connecting the shaft with the piston, means for moving the cylinder toward the piston during the compression stroke and when the crank of the shaft has passed dead center, such means comprising anchor members connected with the cylinder and passing into the crank case, shoes connected with the lower ends of the anchor members, a cam engaging the shoes for lowering the parts, means for operating the cam from the cam shaft, a second cam operated from the crank shaft and projections on the anchor means engaged by the second cam for holding the cylinder in raised position and inlet and exhaust means associated with the cylinder.

In testimony whereof I affix my signature.

GERHARDT PLATO.